(12) United States Patent
Burger et al.

(10) Patent No.: US 8,563,640 B2
(45) Date of Patent: Oct. 22, 2013

(54) METHOD FOR DEAERATING LIQUIDS

(75) Inventors: Willibald Burger, Burghausen (DE);
Ludwig Esterbauer, Ampfing (DE);
Holger Rautschek, Nuenchritz (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/580,520

(22) PCT Filed: Feb. 21, 2011

(86) PCT No.: PCT/EP2011/052493
§ 371 (c)(1),
(2), (4) Date: Aug. 22, 2012

(87) PCT Pub. No.: WO2011/104196
PCT Pub. Date: Sep. 1, 2011

(65) Prior Publication Data
US 2012/0312165 A1    Dec. 13, 2012

(30) Foreign Application Priority Data
Feb. 23, 2010    (DE) .......................... 10 2010 002 234

(51) Int. Cl.
*C08K 5/05*    (2006.01)
(52) U.S. Cl.
USPC ...................................... 524/386; 162/164.4
(58) Field of Classification Search
USPC ...................................... 524/386; 162/164.4
See application file for complete search history.

(56) References Cited

U.S. PATENT DOCUMENTS

| | | | |
|---|---|---|---|
| 3,235,509 A | 2/1966 | Nitzsche et al. | |
| 3,984,347 A | 10/1976 | Keil | |
| 4,804,737 A | 2/1989 | Berger et al. | |
| 5,700,351 A | 12/1997 | Schuhmacher et al. | |
| 6,162,330 A | 12/2000 | Northfleet et al. | |
| 6,605,183 B1 | 8/2003 | Rautschek et al. | |
| 2004/0106749 A1 | 6/2004 | Burger et al. | |
| 2006/0111453 A1 | 5/2006 | Bonn et al. | |
| 2008/0200608 A1 | 8/2008 | Burger et al. | |

FOREIGN PATENT DOCUMENTS

| | | |
|---|---|---|
| DE | 1444442 | 12/1968 |
| DE | 19918361 | 10/2000 |
| DE | 10233701 | 2/2004 |
| EP | 257356 | 10/1990 |
| EP | 1076073 | 2/2001 |
| EP | 1424117 | 6/2004 |
| EP | 2060674 | 5/2009 |
| GB | 2350117 | 11/2000 |
| WO | 2006128624 | 12/2006 |
| WO | 2010108858 | 9/2010 |
| WO | 2010108859 | 9/2010 |

OTHER PUBLICATIONS

"Antifoaming action of polyoxyethylene-polyoxypropylene-polyoxyethylene-type triblock copolymers on BSA foams", Nemeth, Zs.; Racz, Gy.; Koczo, K. Colloids Surf., A, 127(1-3), 151-162, 1997.
Nikolai D. Denkov, "Mechanisms of Foam Destruction by Oil-Based Antifoams", Langmuir 2004, 20, pp. 9263-9505.
Adams, J.W. et al. , "Organosilicone surfactants: Chemistry and Appliations in waterborne coatings and inks" Verfkroniek, 68 (10) 1995 S. pp. 43-45.
Nikolai D. Denkov, "Mechanisms of Foam Destruction by Oil-Based Antifoams", Langmuir 2004, 20, pp. 9463-9505.

*Primary Examiner* — Edward Cain
(74) *Attorney, Agent, or Firm* — Brooks Kushman P.C.

(57) ABSTRACT

Efficient deaeration of aqueous suspensions such as those obtained during textile treatment or pulp and paper production is achieved by use of a combination of a polyoxypropylene polyether polymer or copolymer and branched polyether-polysiloxane copolymers.

2 Claims, No Drawings

METHOD FOR DEAERATING LIQUIDS

CROSS-REFERENCE TO RELATED APPLICATIONS

This application is the U.S. national phase of PCT Appln. No. PCT/EP2011/052493 filed Feb. 21, 2011, which claims priority to German Patent Application No. 2010 002 234.9 filed Feb. 23, 2010, which are incorporated herein by reference.

BACKGROUND OF THE INVENTION

1. Field of the Invention

The invention relates to a process for deaerating liquids, especially for deaerating aqueous suspensions as obtained, for example, in textile treatment or pulp and paper production.

2. Description of the Related Art

In many liquid systems, especially aqueous systems, which contain surface-active compounds as desired or else as undesired constituents, problems can occur with entrapped air bubbles when these systems are brought into more or less intensive contact with gaseous substances, for example in the sparging of waste waters, in the intensive stirring of liquids, and in distillation, washing or dyeing operations. Especially liquids containing particles in fine distribution which can attract air bubbles, for example fibers, tend to entrap air.

In pulp production, the entrapped air prevents, for example, rapid drainage of the water and thus lowers quality and productivity.

Surface foam can be controlled with known defoamers. These consist, for example, of polyorganosiloxanes as described in U.S. Pat. No. 3,235,509 A, of polyorganosiloxanes in combination with polyoxyalkylenes as described in U.S. Pat. No. 3,984,347 A, or else of polyoxyalkylenes alone as described in "Antifoaming action of polyoxyethylene-polyoxypropylene-polyoxyethylene-type triblock copolymers on BSA foams", Nemeth, Zs.; Racz, Gy.; Koczo, K. Colloids Surf., A, 127(1-3), 151-162, 1997.

DE 1444442 A1 discloses that foam destruction in hydraulic fluids containing approx. 50% glycols and polyglycols can be improved by the chemically related polypropylene glycol.

Conventional defoamers are known to be suitable for the control of "dry" surface foam, in which large gas bubbles are separated by thin liquid films (as described in Langmuir 2004, 20, 9463-9505). However, they are ineffective for deaeration of liquid-gas mixtures consisting mainly of liquid, with or without suspended solids.

This is because the surface properties and the solubility of defoamers which destroy the surface foam, which is also referred to as "macrofoam", necessarily differ from the properties of deaerators (see Adams, J. W. et al. Verfkroniek, 68 (10) 1996 p. 43-45). Defoamers must be incompatible and migrate rapidly to the surface. Deaerators which, in contrast, are supposed to control the microfoam must have better compatibility since they are supposed to be effective not at the surface but in the liquid phase. It is therefore impossible to infer deaerator efficacy from a good defoamer efficacy (cf. EP 257 356 B1, page 2, lines 28-31).

Therefore, specific formulations are proposed for these applications. GB 2 350 117 A proposes, for better deaeration, use of linear or cyclic siloxanes bearing Si—C— or Si—O—C-bonded polyether groups. EP 257 356 B1 claims siloxanes with (isobutyryloxy)isopropyldimethyl-propoxy groups, which are said to enable better deaeration of plastisols than polyethersiloxanes.

There is still a need for better and more economic deaerating agents for various applications, especially for the production of pulp.

SUMMARY OF THE INVENTION

It has now been surprisingly discovered that specific polyoxyalkylenes have superior deaeration efficacy.

The invention provides a process for deaerating liquids containing at least 50% by weight and especially at least 70% by weight of water,
by adding 0.0001 to 1.0% by weight, preferably 0.0005 to 0.1% by weight, of polyoxyalkylenes of the formula

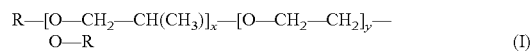

$$R\text{—}[O\text{—}CH_2\text{—}CH(CH_3)]_x\text{—}[O\text{—}CH_2\text{—}CH_2]_y\text{—}O\text{—}R \qquad (I)$$

in which R may be the same or different and is a hydrogen atom, a $C_1$-$C_{30}$-alkyl radical, a $C_1$-$C_{30}$-alkenyl radical or a radical of the formula

$$R^1\text{—}C(O)\text{—} \qquad (II)$$

in which $R^1$ is a $C_1$-$C_{22}$-alkyl radical,
x has a value of 6 to 300 and
y has a value of 0 to 30
and the y/x ratio is 0 to 1, and specific, branched polyether-polysiloxane copolymers
to these liquids.

DETAILED DESCRIPTION OF THE PREFERRED EMBODIMENTS

Examples of R radicals in formula (I) are hydrogen and the methyl, allyl and butyl radicals. The R radical is preferably a hydrogen atom.

Examples of the radicals of the formula $R^1$ are the methyl and butyl radicals.

In the formula (I), the index x is preferably 15 to 150, more preferably 25 to 100. The y/x ratio is preferably 0 to 0.75, more preferably 0 to 0.25 and especially 0 to 0.1. In a particularly preferred variant, y=0.

The polyoxyalkylenes of the formula (I) preferably have a mean molar mass (number average $M_n$) of 600 to 20,000, preferably 800 to 12,000.

The polyoxyalkylenes used are preferably polypropylene glycols having a mean molar mass (number average $M_n$) of 1000 to 8000 g/mol.

It is possible to use one kind of polyoxyalkylene or two or more kinds of polyoxyalkylenes.

The oxyalkylene groups may be in random distribution in the polyoxyalkylenes of the formula (I), or may be present as block copolymers.

Polyoxyalkylenes of the formula (I) are known commercial products. According to the values of x and y, the polyoxyalkylenes are liquids or waxy products, preference being given to liquid products having a viscosity (at 25° C. and 1013 hPa) of 400 to 1500 mm²/s.

The solubility of the polyoxyalkylenes in water is determined by the ratio of y/x. Preference is given to using polyoxyalkylenes which are soluble to an extent of less than 2% in water at 25° C. and 1013 hPa, or have a cloud point (measured to EN 1890 Variant A) of less than 35° C., especially less than 25° C.

Deaeration in the context of this invention is a process in which the gas content of a liquid containing gas in dispersed form, i.e. containing a microfoam in which the proportion by volume of the liquid in the microfoam is higher than the proportion by volume of gas, is reduced.

A process for deaerating liquids is understood in the context of the invention to mean, more particularly, a process in which the gas content of a liquid phase containing preferably at most 50% by volume, more preferably at most 20% by volume and especially at most 10% by volume of gas in dispersed form is significantly reduced, such that preferably a gas content of less than 5% by volume and especially of less than 2% by volume is attained.

The invention more preferably provides a process for deaeration of the liquids obtained in pulp production, preferably aqueous fiber-containing suspensions having a water content of at least 70% by weight.

The liquids to be deaerated contain, aside from the inventive addition of polyoxyalkylenes of the formula (I), preferably less than 1% by weight and more preferably less than 0.1% by weight of further glycols or polyglycols, and more preferably no further glycols or polyglycols.

In the production of pulp, which is a cellulose product containing a greater or lesser level of impurities, from cellulosic materials such as wood, different digestion solutions are used to dissolve the other constituents such as lignin. In a subsequent washing and sieving operation, the pulp obtained is separated from the digestion solution and purified.

Probably the most important digestion process is the alkaline sulfate or Kraft process, in which a digestion solution containing NaOH/NaS is used to obtain what is called the sulfate or Kraft pulp. A further product obtained is black liquor which, as well as the digestion solution, contains the other constituents of cellulosic materials such as wood.

The inventive polyoxyalkylenes can be used directly or, owing to better distribution and handling, as a solution in suitable organic substances, or as an emulsion.

Suitable organic additives to the inventive polyoxyalkylenes of the formula (I) are mineral oils, native oils, isoparaffins, polyisobutylenes, residues from oxoalcohol synthesis, esters of low molecular weight synthetic carboxylic acids, for example 2,2,4-trimethyl-1,3-pentanediol diisobutyrate, fatty acid esters, for example dodecyl palmitate or isopropyl myristate, fatty alcohols, ethers of alcohols, phthalates and esters of phosphoric acid.

Suitable further additives to the inventive polyoxyalkylenes of the formula (I) are polyether-polysiloxane copolymers, which may be linear or branched.

It is possible to use one kind of polyether-polysiloxane copolymers or two or more kinds of polyether-polysiloxane copolymers.

A preferred embodiment of the invention is a process for deaerating liquids containing at least 50% by weight and especially at least 70% by weight of water by adding 0.0001 to 1.0% by weight and preferably 0.0005 to 0.1% by weight of a mixture of 100 parts by weight of polyoxyalkylenes of the formula

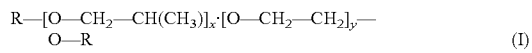

(I)

especially polypropylene glycols having a mean molar mass (number average $M_n$) of 1000 to 8000 g/mol,
and 1 to 200 parts by weight, preferably 2 to 100 parts by weight, of polyether-polysiloxane copolymers.

Such polyether-polysiloxane copolymers form part of the prior art and are known to those skilled in the art.

Examples of linear polyether-polysiloxane copolymers are those in which the polyether radicals are laterally SiC-bonded to linear siloxane chains via hydrocarbyl radicals, preferably divalent hydrocarbyl radicals. Such linear polyether-polysiloxane copolymers are described, for example, in GB 2 350 117 A.

Examples of branched polyether-polysiloxane copolymers are those in which the polyether radicals are SiC-bonded laterally to linear siloxane chains via hydrocarbyl radicals, preferably divalent hydrocarbyl radicals, and where these linear siloxane chains are bonded to one another via lateral organic bridges. Examples of these organic bridges are SiC-bonded linear or branched organic radicals, preferably divalent hydrocarbyl radicals, which may contain one or more heteroatoms selected from the group of oxygen and nitrogen atoms, such as alkylene radicals, SiC-bonded polyether radicals which are bonded via alkylene radicals to siloxane chains, and SiC-bonded divalent hydrocarbyl radicals such as alkylene radicals, containing polyether and urethane groups.

Of particularly good suitability are branched polyether-polysiloxane copolymers as described, for example, in EP 1 076 073 A1, EP 1 424 117 A2 or WO 2006/128624 A1, as a component of defoamers.

The branched polyether-polysiloxane copolymers used are preferably those in which the siloxane chains are bonded to one another via lateral divalent SiC-bonded hydrocarbyl radicals containing polyether radicals and urethane groups.

These polyether-polysiloxane copolymers and the preparation thereof are described in WO 2006/128624 A1, especially on page 3 line 8 to page 13 line 38 (incorporated by reference).

The inventive polyether-polysiloxane copolymers preferably have a viscosity of 50 to 100,000,000 mPa·s at 25° C., more preferably 100 to 1,000,000 mPa·s at 25° C. and most preferably 1000 to 100,000 mPa·s at 25° C.

Description of the Deaeration Experiments:

350 ml of black liquor from the pulp process (hard- and softwood from UPM Kymmene Oy Kuusankoski, Finland, having a water content of greater than 80% by weight) are heated to 80° C. under constant conditions with stirring in a beaker for 15 minutes, then 220 ml thereof are transferred into a stirred glass autoclave likewise thermostated at 80° C.

Determination of $D_0$:

The autoclave is closed without adding deaerator and, after a wait time of 3 seconds, the outlet valve at the base of the autoclave is opened for 5 seconds.

The black liquor is then discharged into a measuring cylinder under pressure 3 bar and, immediately thereafter, the mass and the volume for the density calculation are determined.

Determination of $D_2$:

The autoclave is closed without adding a deaerator and the black liquor present is stirred at 800 rpm under a compressed air pressure of 3 bar for 10 minutes. After a wait time of 3 seconds, the outlet valve at the base of the autoclave is opened for 5 seconds.

The black liquor is then discharged into a measuring cylinder under pressure 3 bar and, immediately thereafter, the mass and the volume for the density calculation are determined.

Determination of $D_1$:

The autoclave is closed after adding the amount of a deaerator specified in the table below and the black liquor present is stirred at 800 rpm under a compressed air pressure of 3 bar for 10 minutes. After a wait time of 3 seconds, the outlet valve at the base of the autoclave is opened for 5 seconds.

The black liquor is then discharged into a measuring cylinder under pressure 3 bar and, immediately thereafter, the mass and the volume for the density calculation are determined.

$D_0$=density of the black liquor at 80° C. without deaerator; without stirring $D_2$=density of the black liquor at 80° C. without deaerator; after stirring $D_1$=density of the black liquor at 80° C. with deaerator; after stirring Deaeration in %=100×$(D_1-D_2)/(D_0-D_2)$ $D_0$ (hardwood): 1.01 g/cm³ and $D_2$ (hardwood): 0.83 g/cm³.
$D_0$ (softwood): 1.03 g/cm³ and $D_2$ (softwood): 0.77 g/cm³.

Examples 1 and 2 (with polymers 1 and 2),

Example 3 (mixture of 70% polymer 1 and 30% polymer C1),

Example 4 (mixture of 70% polymer 1 and 30% polymer C3),

Comparative Experiments 1 and 2 (with polymers C1 and C2),

Comparative Experiment 3 (mixture of 70% polymer 1 and 30% polymer C4).

For use as deaerators, polymers 1 and 2 in examples 1 and 2 and polymers C1 and C2 in comparative experiments and 2 are metered directly into the black liquor without any further additive.

Polymer 1:

Polymer 1 is a polypropylene glycol with a mean molar mass (number average $M_n$) of 2000.

Polymer 2:

Polymer 2 is a copolymer of ethylene oxide and propylene oxide in which polyethylene oxide forms the central molecular moiety with the general structural formula

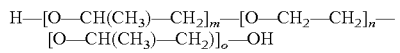
H—[O—CH(CH₃)—CH₂]ₘ—[O—CH₂—CH₂]ₙ—[O—CH(CH₃)—CH₂)]ₒ—OH

The mean molar mass (number average $M_n$) is 3500 g/mol, the molar proportion by mass of polypropylene oxide being approx. 3100 g/mol.

Polymer C1:

In comparative experiment 1, the deaerator used is a linear polyether-polysiloxane copolymer according to the prior art, as per GB 2 350 117 A. This was prepared as follows:

67 g of a siloxane terminated with methyl groups, composed of dimethylsiloxy and hydromethylsiloxy units and having an active hydrogen content of 0.133% and a viscosity of 72 mm²/s (25° C.) are mixed by stirring vigorously with 408 g of an allyl polyether (H₂O content 560 ppm) having a PO/EO ratio of 4.0 and an iodine number of 11.2, and the mixture was heated to 100° C. Addition of 0.5 ml of a 2% solution of hexachloroplatinic acid in isopropanol starts the hydrosilylation, which is manifested in a weakly exothermic reaction. The reaction mixture is kept at 100 to 110° C. until a clear copolymer is obtained and no active hydrogen is detectable any longer. The polysiloxane with lateral polyether groups has a viscosity of 870 mm²/s (25° C.)

Polymer C2:

In comparative experiment 2, a polypropylene oxide with a mean molar mass (number average $M_n$) of 400 g/mol, which is not in accordance with the invention, is used.

Polymer C3 (According to WO 2006/128624 A1):

Polymer C1 is heated to 130° C., and water traces are removed at 1 hPa. Thereafter, 7 g of hexamethylene diisocyanate are metered in and the mixture is homogenized for 20 minutes. The isocyanate reaction is started with 1 drop of dibutyltin laurate (DBTL). After two hours, the NCO content has fallen below the detection limit (IR: 20 ppm), and so 120 g of a surfactant (commercially available under the Emulan® HE 50 from BASF SE, Ludwigshafen, Germany) are metered in. After cooling to 25° C., the 80% copolymer solution has a viscosity of 2100 mm²/s and a urethane content of 0.139 meq/g.

Polymer C4:

Polymer C4 is a polydimethylsiloxane having a chain length of approx. 200, as described in claim 1 in DE 1444442.

The amounts of the polymers or mixtures thereof added to the black liquor are reported in the table.

The results of the testing of the efficacy in deaeration are compiled in the table.

TABLE

| Examples/ Comparative Examples | Deaerator | Amount added in μl | Dearation in black liquor from hardwood in % | Dearation in black liquor from softwood in % |
|---|---|---|---|---|
| Example 1 | polymer 1 | 8 | 53.0 | 83.2 |
| Example 2 | polymer 2 | 8 | 52.9 | 78.5 |
| Example 3 | 70% polymer 1 and 30% polymer C1 | 8 | 55.8 | 85.6 |
| Example 4 | 70% polymer C1 and 30% polymer C3 | 8 | 58.1 | 88.9 |
| Comparative Example C1 | polymer C1 | 8 | 43.9 | 69.2 |
| Comparative Example C2 | polymer C2 | 8 | 0 | 0 |
| Comparative Example C3 | 70% polymer 1 and 30% polymer C4. The two polymers are not homogeneously miscible, and so no deaeration experiments were conducted. | n.a. | n.a. | n.a. |

As can be inferred from the table, deaeration in comparative experiments 1 and 2 is much poorer than in examples 1 to 4.

In comparative experiment 1, an unbranched linear polyether-polysiloxane copolymer analogous to GB 2 350 117 A is used; in comparative experiment 2, a noninventive polypropylene glycol is used.

In example 3, a homogeneous mixture of 70% polymer 1 and 30% polymer C1, a linear polyether-polysiloxane copolymer, is used. Addition of 30% of polymer C1 makes polymer 1 water-dispersible.

Surprisingly, the mixture of 70% polymer 1 and 30% polymer C1 in black liquor from hard- and softwood shows better deaeration than the two individual polymers.

In example 4, a homogeneous mixture of 70% polymer 1 and 30% polymer C3, a branched polyether-polysiloxane copolymer, is used as a deaerator. Addition of 30% of polymer C3 improves the efficacy of polymer 1 once again.

In comparative example C3, a mixture of 70% polymer 1 and 30% polymer C4, a dimethylpolysiloxane, according to DE 1444442 A is used. The mixture is unstable and separates into 2 phases within a few minutes. Since a homogeneous mixture which is stable over a prolonged period is of crucial importance for the later practical handling and use as a deaerator, no deaeration experiments were conducted.

The invention claimed is:

1. A process for deaerating gas-containing aqueous fiber-containing liquid suspensions which are obtained in pulp production, and contain at least 70% by weight of water, comprising:

adding to the liquid 0.0001 to 1.0% by weight based on the weight of the aqueous fiber-containing liquid suspensions of a mixture of 100 parts by weight of polypropylene glycol(s) having a mean molar mass (number average $M_n$) of 1000 to 8000 g/mol, and 1 to 200 parts by weight of branched polyether-polysiloxane copolymers in which the polyether radicals are SiC-bonded laterally to linear siloxane chains via hydrocarbyl radicals and where these linear siloxane chains are bonded to one another via lateral organic bridges.

2. The process of claim 1, wherein a gas-containing liquid is present in the form of a microfoam containing gas in dispersed form and in which the proportion by volume of the liquid in the microfoam is higher than the proportion by volume of gas, wherein the content of gas in the microfoam is reduced.

* * * * *